United States Patent
Teper

(10) Patent No.: US 6,758,005 B2
(45) Date of Patent: Jul. 6, 2004

(54) APPARATUS AND METHOD FOR CROWNING THE BARREL OF A FIREARM

(76) Inventor: Boris R. Teper, 29383 Breezeway, Farmington Hills, MI (US) 48331

( * ) Notice: Subject to any disclaimer, the term of this patent is extended or adjusted under 35 U.S.C. 154(b) by 0 days.

(21) Appl. No.: 10/459,176

(22) Filed: Jun. 11, 2003

(65) Prior Publication Data

US 2003/0230021 A1 Dec. 18, 2003

Related U.S. Application Data

(60) Provisional application No. 60/388,374, filed on Jun. 12, 2002, now abandoned.

(51) Int. Cl.$^7$ .................................................. F41A 11/00
(52) U.S. Cl. ....................... 42/90; 42/76.01; 29/DIG. 67
(58) Field of Search ........................... 42/90, 95, 76.01; 89/14.05; 29/DIG. 67

(56) References Cited

U.S. PATENT DOCUMENTS

| | | | | |
|---|---|---|---|---|
| 1,017,883 A | * | 2/1912 | Landis | .................. 408/151 |
| 2,377,271 A | * | 5/1945 | Schumann | .................. 464/17 |
| 5,782,030 A | * | 7/1998 | French | .................. 42/76.01 |
| 6,032,398 A | * | 3/2000 | Carpenteri et al. | ............. 42/90 |

FOREIGN PATENT DOCUMENTS

| | | | | |
|---|---|---|---|---|
| WO | WO 93/12320 | * | 6/1993 | ............ 29/DIG. 67 |

* cited by examiner

Primary Examiner—Stephen M. Johnson
(74) Attorney, Agent, or Firm—MacMillan, Sobanski & Todd, LLC

(57) ABSTRACT

An apparatus and method for crowning a muzzle end of a firearm barrel includes inserting an elongated rod-like pilot stem with upper and lower ends into a barrel bore. The stem has an expandable collet slidably received thereon and a nut threadably attached to the lower end. A deformable body is attached to the nut to frictionally engage a bore wall to prevent rotation of the nut and permit rotation of the stem to expand the collet into contact with the bore wall. A cutting tool is rotated on the upper end of the stem to cut an end surface of the muzzle end.

20 Claims, 4 Drawing Sheets

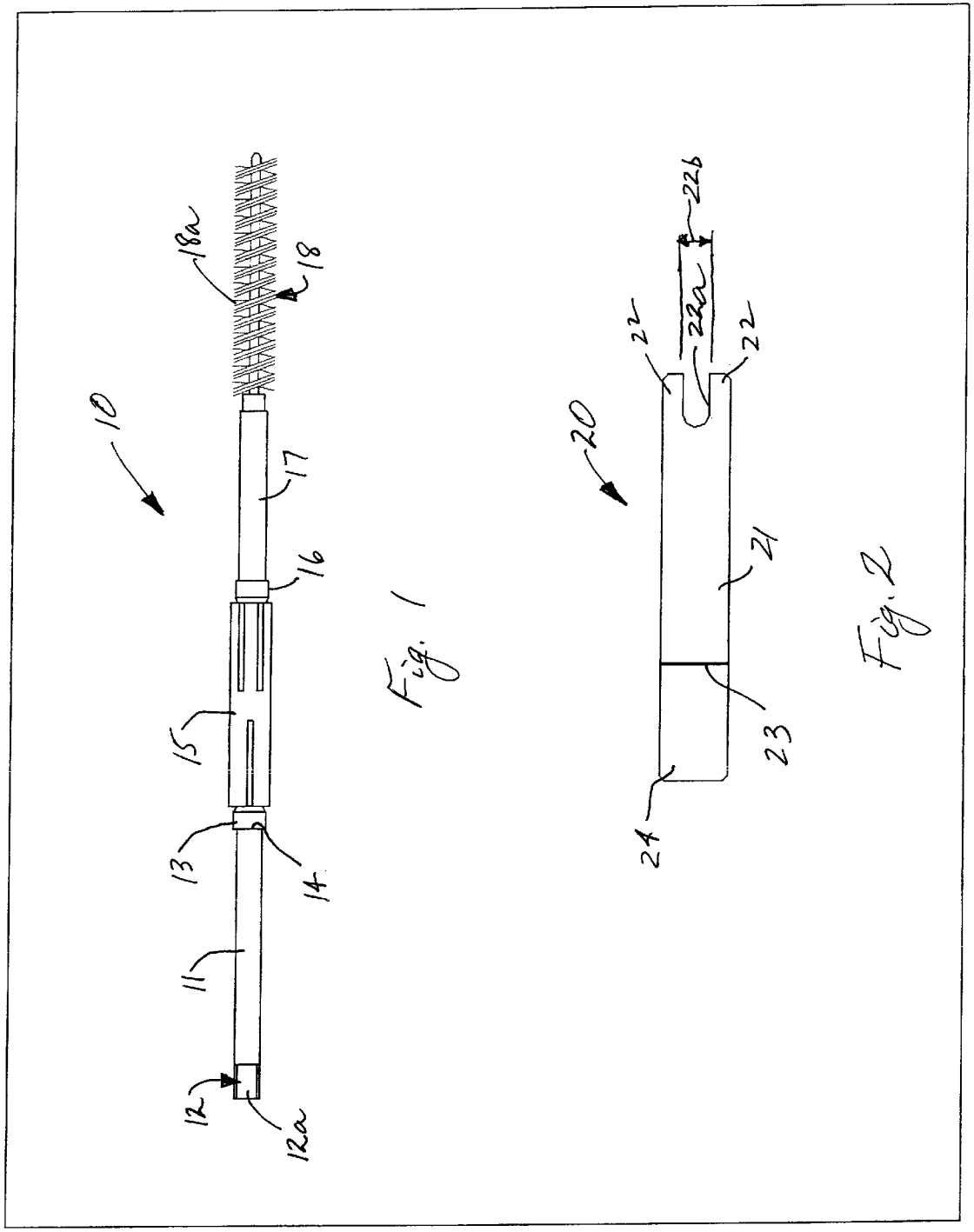

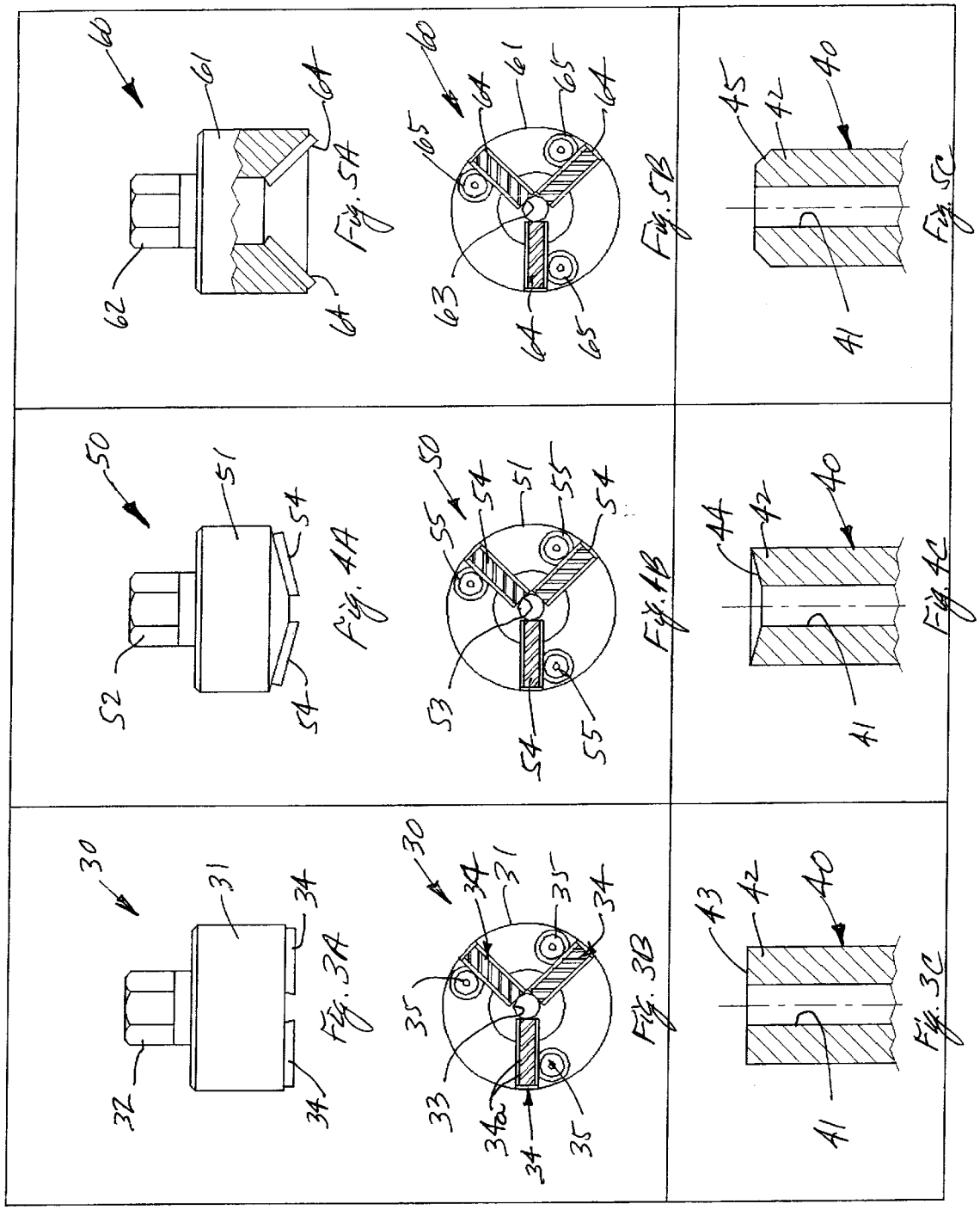

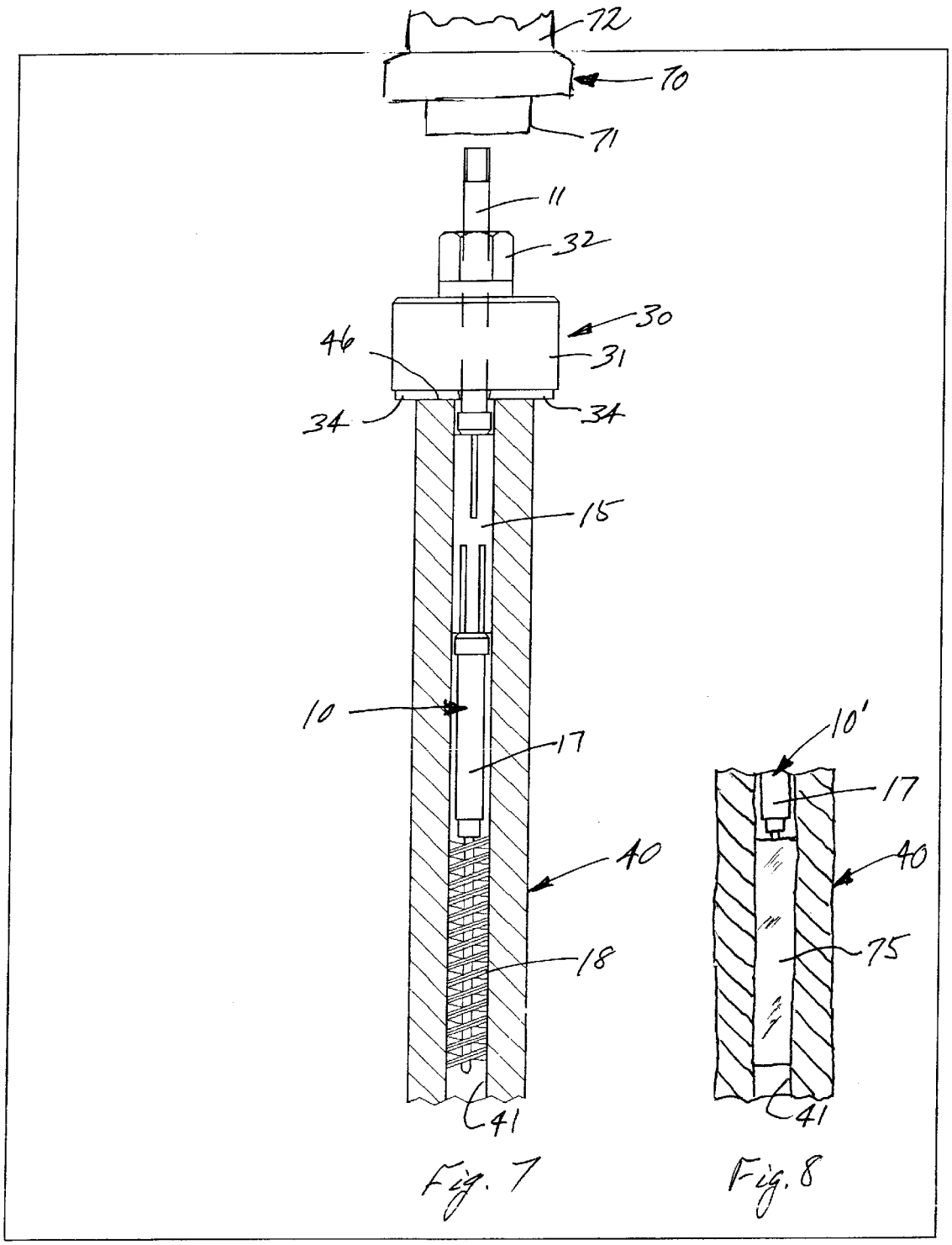

APPARATUS AND METHOD FOR CROWNING THE BARREL OF A FIREARM

CROSS-REFERENCE TO RELATED APPLICATION

This application claims the benefit of U.S. provisional patent application serial No. 60/388,374 filed Jun. 12, 2002 now abandoned.

BACKGROUND OF THE INVENTION

The present invention relates generally to the reconditioning of firearms and, in particular, to an apparatus and method for crowning the barrel of a firearm.

A firearm barrel is typically an elongated steel tube with or without machined spiral grooves, or rifling, in the bore of the barrel. The crowning process is performed on an outlet face of the firearm barrel and consists of machining the face of the barrel so that the face is square, chamfering the face to a predetermined angle, and deburring the face, or removing any sharp edges caused by the machining or chamfering. The facing, chamfering, and deburring processes are performed with the use of separate cutting tools. Care must be taken to not damage the rifling in the bore when operating the cutting tools.

SUMMARY OF THE INVENTION

The present invention concerns an apparatus and method for crowning the muzzle end of a barrel of a firearm. The apparatus includes a pilot stem having an expandable collet for securing the stem in the bore of the barrel to ensure that the rifling in the bore remains undamaged during the crowning process. Various types of cutting tools can be rotatably mounted on the pilot stem. The apparatus includes an antirotation means, such as a brush or a deformable body, that frictionally engages the wall of the bore to permit the collet to be expanded and contracted. The apparatus preferably employs the use of serrated cutter blades for crowning the barrel.

The apparatus according to the present invention comprises: an elongated rod-like pilot stem with upper and lower ends, the upper end having a wrench socket formed thereon, and a downwardly facing pilot shoulder formed intermediate the upper and lower ends; a pair of expanders slidably received on the lower end of the pilot stem, one of the expanders engaging the pilot shoulder; an expandable collet slidably received on the pilot stem and disposed between the expanders; a nut threadably attached to the lower end of the pilot stem; a deformable body attached to the nut whereby when the deformable body is inserted into a bore at a muzzle end of a firearm, the deformable body frictionally engages a wall of the bore to prevent rotation of the nut and permit rotation of the pilot stem relative to the nut in an engaging direction to expand the collet into contact with the wall of the bore; and a cutting tool rotatably received on the pilot stem at the upper end for engaging an end surface of the muzzle end.

The method according to the present invention comprises the steps of: a) inserting an expandable collet on a pilot stem attached to a deformable body a predetermined distance into a bore at a muzzle end of a firearm barrel and frictionally engaging a wall of the bore with the deformable body; b) rotating the pilot stem to expand the collet into engagement with the wall of the bore; c) mounting a cutting tool on an upper end of the pilot stem and rotating the cutting tool relative to the pilot stem against an end surface of the muzzle end; d) removing the cutting tool from the pilot stem; e) rotating the pilot stem to retract the collet out of engagement with the wall of the bore; and f) removing the pilot stem, the collet and the deformable body from the bore.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is an elevation view of an expandable pilot used in the method and apparatus in accordance with the present invention;

FIG. 2 is a plan view of a pilot wrench used with the expandable pilot of FIG. 1;

FIGS. 3A and 3B are an elevation view and a bottom plan view respectively of a facing cutter in accordance with the present invention and FIG. 3C is a cross-sectional view of a gun barrel after application of the facing cutter;

FIGS. 4A and 4B are an elevation view and a bottom plan view respectively of a chamfering cutter in accordance with the present invention and FIG. 4C is a cross-sectional view of a gun barrel after application of the chamfering cutter;

FIGS. 5A and 5B are an elevation view and a bottom plan view respectively of a deburring cutter in accordance with the present invention and FIG. 5C is a cross-sectional view of a gun barrel after application of the deburring cutter;

FIG. 7 is a view similar to FIG. 6 with the facing cutter of FIGS. 3A and 3B installed on the expandable pilot; and FIG. 8 is a fragmentary view similar to FIG. 7 showing an alternate embodiment of the expandable pilot.

DESCRIPTION OF THE PREFERRED EMBODIMENT

Figure 6:
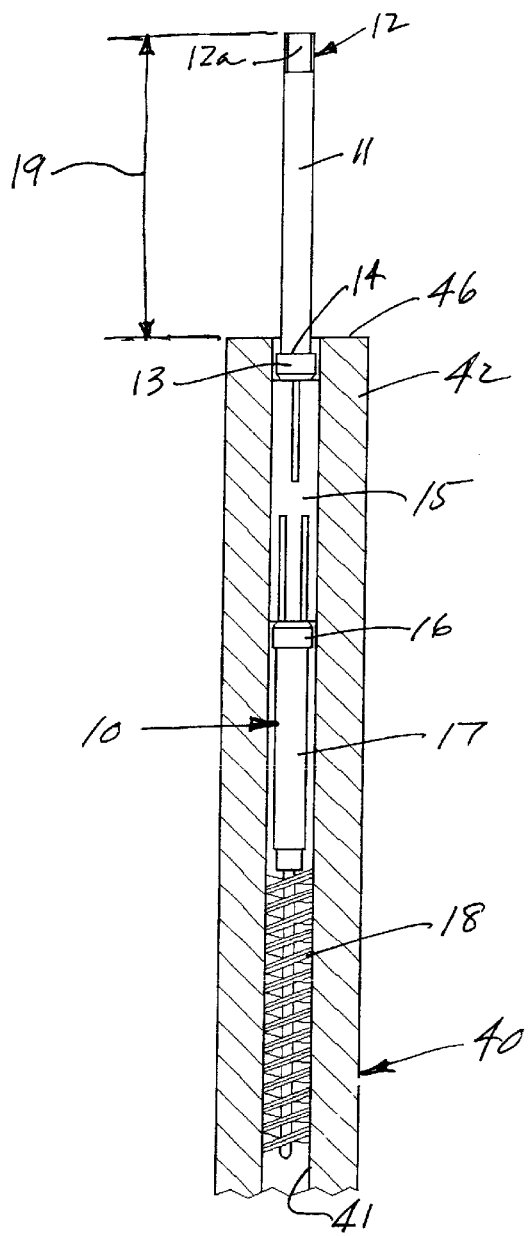
FIG. 6 is a cross-sectional view of the gun barrel shown in FIGS. 3C, 4C and 5C with the expandable pilot of FIG. 1 inserted in the bore.

A muzzle crown refacing toolkit in accordance with the present invention can be used to reface or completely form a precision muzzle crown on rifle, shotgun and handgun barrels made from commonly used carbon, alloy or stainless steel, including chrome lined barrels. No further deburring, lapping or polishing of bore edge is necessary. There is shown in FIG. 1 an expandable pilot 10 used in the method and apparatus in accordance with the present invention. The pilot 10 include a pilot stem 11 having a wrench socket 12 formed at a free end, which is a top end of the expandable pilot. The pilot stem 11 is generally circular in cross section and has a pair of opposed flats 12a (only one is shown) formed at the free end to define the wrench socket 12. An annular or tubular top expander 13 is slidably received on the pilot stem 11 and abuts a downwardly facing shoulder 14 formed on the stem. The pilot stem 11 extends into a slidably received hollow expandable collet 15 such that the top expander 13 is adjacent a top end of the collet. An annular or tubular bottom expander 16 is slidably received on the pilot stem 11 adjacent a bottom end of the collet 15. The bottom expander 16 abuts an elongated nut 17 threadably received on a bottom end of the pilot stem 11 and having a bore brush 18 extending from a free end thereof. The bore brush 18 is a deformable body formed of a plurality of bristles 18a that can be made of any suitable material such as nylon or horsehair.

As explained below, if the nut 17 is prevented from rotation and the pilot stem 11 is rotated for additional threaded engagement with the nut, the top expander 13 and the bottom expander 16 are forced toward one another and the expandable collet 15 will be longitudinally compressed and radially expanded. The stem 11 can be rotated using a pilot wrench 20 shown in FIG. 2. The wrench 20, shown in plan view, has a generally planar body 21 with a pair of spaced apart longitudinally extending legs 22 formed at one end of the body. The legs define an opening 22a therebetween that has a width 22b slightly greater than a spacing between the flats 12a of the wrench socket 12. The body 21 also includes a transverse insertion mark 23 the purpose of which is explained below. A handle 24 is formed on an end of the body 21 opposite the legs 22.

In FIGS. 3A and 3B, 4A and 4B and 5A and 5B there are shown three types of cutters used with the expandable pilot 11 of FIG. 1. In FIGS. 3A and 3B, there is shown a facing cutter 30 having a body 31 of generally cylindrical cross section with a driver hex portion 32 formed at a top surface. A central bore 33 extends along a longitudinal axis of the body 31 and is sized to receive the pilot stem 11 permitting rotation of the cutter 30 about the longitudinal axis of the expandable pilot 10. Attached to and extending downwardly from a bottom surface of the body 31 are three radially extending cutter blades 34 equally spaced about the central bore 33. Each of the cutter blades 34 is releasably attached to the body 31 by an associated blade screw 35 to provide a generally horizontally extending cutting surface. The cutter blades 34 are serrated with a plurality of cutting edges 34a, but could be of the type having a single cutting edge. The serrated blades 34 tend to prevent digging into the metal surface being refaced.

A portion of a gun or firearm barrel 40 is shown in cross section in FIG. 3C having a longitudinally extending bore 41 open at a muzzle end 42 of the barrel. If the cutter 30 is rotated coaxially relative to the bore 41, the cutters 34 will form a flat crown surface 43 at the end 42 transverse to the longitudinal axis of the bore.

In FIGS. 4A and 4B, there is shown a chamfering cutter 50 having a body 51 of generally cylindrical cross section with a driver hex portion 52 formed at a top surface. A central bore 53 extends along a longitudinal axis of the body 51 and is sized to receive the pilot stem 11 permitting rotation of the cutter 50 about the longitudinal axis of the expandable pilot 10. Attached to and extending downwardly from a bottom surface of the body 51 are three radially extending cutter blades 54 equally spaced about the central bore 53. Each of the cutter blades 54 is releasably attached to the body 51 by an associated blade screw 55 to provide a generally outwardly and upwardly extending cutting surface. The cutter blades 54 are serrated.

A portion of the gun barrel 40 is shown in cross section in FIG. 4C having the longitudinally extending bore 41 open at the muzzle end 42 of the barrel. If the cutter 50 is rotated coaxially relative to the bore 41, the cutters 54 will form a chamfered crown surface 44 at the end 42 transverse to the longitudinal axis of the bore.

In FIGS. 5A and 5B, there is shown a deburring cutter 60 having a body 61 of generally cylindrical cross section with a driver hex portion 62 formed at a top surface. A central bore 63 extends along a longitudinal axis of the body 61 and is sized to receive the pilot stem 11 permitting rotation of the cutter 60 about the longitudinal axis of the expandable pilot 10. Attached to and extending downwardly from a bottom surface of the body 61 are three radially extending cutter blades 64 equally spaced about the central bore 63. Each of the cutter blades 64 is releasably attached to the body 61 by an associated blade screw 65 to provide a generally outwardly and upwardly extending cutting surface. The cutter blades 64 are serrated.

A portion of the gun barrel 40 is shown in cross section in FIG. 5C having the longitudinally extending bore 41 open at the muzzle end 42 of the barrel. If the cutter 60 is rotated coaxially relative to the bore 41, the cutters 64 will form a chamfered crown surface 45 at the end 42 transverse to the longitudinal axis of the bore.

The cutters 30, 50 and 60 are similar in design to valve seat cutters of the type available from Neway Manufacturing Inc. of Corunna, Mich. having replaceable and adjustable blades.

The method according to the present invention is performed as follows:

As a first step, make sure that the firearm is not loaded. It is not necessary to disassemble firearm in order to perform the muzzle crown refacing procedure, except when working with a pistol. When working with a pistol barrel, it is recommended that the pistol is field striped so that pilot does not interfere with the breech. Next, secure the firearm in a vise, preferably in a vertical position with muzzle end of the firearm pointing up. If vise is not available or its use is not desirable, the firearm can be manually held by a second person. However, it is recommended that a vise is used whenever possible, because it allows for better precision of muzzle crown refacing and generally, faster completion of the work.

The expandable pilot 10 is sized to the diameter of the bore 41. Thus a plurality of "standard" collet diameters can be provided to be used with different bores wherein some collet diameters can be used with more than one bore diameter. The pilot 10 having a diameter suitable for the bore of the barrel to be crowned is selected. As shown in FIG. 6, the brush end of the selected pilot 10 is inserted into the bore 41, carefully pushing the bore brush 18, the nut 17, the bottom expander 16, the collet 15 and the top expander 14 down into the bore. The pilot shoulder 14 should be about 3/16" below a to be finished end surface 46 of the barrel. An insertion indication distance 19 is the distance between the upper end of the pilot stem 11 and the end surface 46 of the muzzle end 42. The pilot wrench 20 can be used as a depth insertion gauge by engaging a free end of one of the legs 22 with the surface 46 and aligning the upper end of the pilot stem 11 with the insertion mark 23. As an alternative to the mark 23, the free end of the handle 24 can be used as the measuring point.

The expandable collet 15 must be loose (not expanded) and the bore brush 18 should slide into the bore 41 without excessive force. The expandable collet 15 must always be completely positioned inside the bore 41. If the barrel 40 is too short (e.g., a handgun barrel), and bore brush 18 exits the chamber end of the barrel when the expandable pilot 10 is in the recommended position and holding the bore brush by hand while performing the next step is necessary.

In the next step, the pilot stem 11 is turned clockwise with a finger grip as tight as is comfortable. Then the pilot wrench 20 is engaged with the wrench socket 12 and used to additionally rotate the pilot stem 11 clockwise approximately ¼ of a turn to expand the collet 15 until snug in the bore 41. A check can be made to determine whether the pilot 10 is secured firmly inside the barrel bore 41 by applying some side pressure by hand in several radial directions. If the pilot 10 wobbles, the pilot stem 11 is turned to further expand the collet 15 just a bit more. Care should be taken not to overtighten to avoid damage to the collet 15. However, the accuracy of the muzzle crown cutting depends upon a tight fitting pilot inside the bore.

Typically, the blades 34, 54 and 64 are formed of a tungsten carbide material and installed on the respective cutter 30, 50 and 60 to cut the muzzle end of the barrel with an outside diameter of no more than 1⅛" and a minimal bore diameter of 5.5 mm. However, the blades can be moved outwardly to increase the outside diameter to 1⅜" if necessary. If the blades are moved or replaced, one should make sure that all screws 35, 55 and 65 holding blades in place are tight. To restore to the original blade settings of the facing and chamfering cutters, a gauge pin (not shown) similar to the pilot stem 11, is inserted into the central bore 33 or 53 and extends below the bottom of the body 31 or 51. The gauge pin has a diameter smaller than the diameter of the central bore so that the pin extends through the bore at an angle to the longitudinal axis of the bore and can contact the top and bottom ends of the central bore at diametrically opposed points. Thus, the radially inner ends of the blades 34 and 54 can be positioned to contact the pin and the screws 35 and 55 respectively tightened to set the blades in the proper positions.

If the end surface 46 of the muzzle is roughly machined, severely worn out or damaged, it is highly recommended that the facing cutter 30 be used first face and square off the muzzle end of the barrel. As shown in FIG. 7, the facing cutter 30 is installed on the pilot stem 11 and slowly lowered until the cutter blades 34 abut the surface 46. A suitable hex wrench or driver tool is placed on the driver hex 32 and a downward pressure is applied to maintain a downward pressure close to the longitudinal axis of the expandable pilot 10. For example, a driver tool 70 having a spring loaded spindle 71 surrounded by a tool body 72 can be used. The spring (not shown) biases the body 72 upwardly relative to the spindle 71. The spindle 71 engages the driver hex 32 (52 or 62) and can be rotated relative to the tool body 72 by a handle (not shown). The pressure can be applied by gripping the driver tool body 72 with one hand and pushing downwardly while rotating the driver tool spindle 71 with the other hand. The rotation should be started slowly turning clockwise, using the driver tool handle to apply some downward pressure to the body 31 of the cutter 30. Several turns should be made and then slowly release the pressure while still turning the driver tool 70. It is recommended to use any proven cutting coolant/lubricant while cutting. A few drops are usually quite sufficient, and help to cut certain metal alloys more aggressively. Use a cleaning brush (not shown) if necessary to remove metal chips accumulated on top and between serrations 34a of the blades 34.

The driver 70 and the cutter 30 are then removed to inspect the surface 46 and determine from the size of any pits, scratches and other imperfections the amount of material that must be removed with one or more additional cuts. If more cuts required, the steps of using the facing cutter 30 should be repeated until the face of the muzzle end is free of all imperfections. It may take several cuts depending upon the initial condition of the muzzle end. After muzzle end is completely faced and squared off, it is recommended to make a few turns of the cutter 30 with a very low downward pressure using the coolant/lubricant. This will produce a better final finish without noticeable removal of material.

After the muzzle of the barrel is completely faced, the facing cutter 30 is removed and the chamfering cutter 40 is used in a similar manner. The cutter 50 can be set to make an eleven degree chamfer for example. The steps are repeated until a desired width of the crown is achieved. Probably a very low resistance will be felt while turning the driver in the beginning of chamfering.

The chamfering cutter 50 is removed and, if desired, the deburring cutter 60 can be used in a manner similar to the other cutters to break sharp edges or to form a chamfer of desired width on the outside of the muzzle end.

When finished with the cutters, the pilot wrench 20 is engaged with the wrench socket 12 to turn the pilot stem 11 counterclockwise one and one half to two turns to release the collet 15 from the bore 41. When the pilot 10 is slightly loose (it should wobble), it can be grasped firmly with your fingers and pull it out of the bore. Sometimes it takes a bit more effort to pull the pilot 10 out of the bore 41 than to insert it. This happens because the brush bristles 18a are moving against direction of brush insertion. If this appears to be the case, the pilot 10 can be slowly pushed further into the bore 41, but no more than ⅛" or so, then the pilot is grasped as close to the muzzle as possible with your thumb is positioned against the muzzle, and to very slowly start pulling the pilot out using your thumb pushing against the muzzle. Pliers or some other tool should not be used to remove the pilot 10 in order to avoid damage to the pilot. If pilot cannot be removed in the recommended way, a cleaning rod inserted from the chamber end can be used to push the pilot out of the bore.

There is shown in FIG. 8 an alternate embodiment expandable pilot 10' having a deformable body in the form of a resilient material cylinder 75 in place of the brush 18. The cylinder 75 can be formed of a relatively soft rubber or plastic material, for example, that has a larger diameter than the bore 41 and deforms to frictionally engage the wall of the bore.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for crowning the muzzle end of a barrel of a firearm comprising:
    an elongated rod-like pilot stem with upper and lower ends, said upper end having a wrench socket formed thereon, and a downwardly facing pilot shoulder formed intermediate said upper and lower ends;
    a pair of expanders slidably received on said lower end of said pilot stem, one of said expanders engaging said pilot shoulder;
    an expandable collet slidably received on said pilot stem and disposed between said expanders;
    a nut threadably attached to said lower end of said pilot stem;
    a deformable body attached to said nut whereby when said deformable is inserted into a bore at a muzzle end of a firearm, said deformable frictionally engages a wall of the bore to prevent rotation of said nut and permit rotation of said pilot stem relative to said nut in an engaging direction to expand said collet into contact with the wall of the bore; and
    a cutting tool rotatably received on said pilot stem at said upper end for engaging an end surface of the muzzle end.

2. The apparatus according to claim 1 wherein said deformable body is one of a brush with deformable bristles and a cylinder of deformable cylinder.

3. The apparatus according to claim 1 wherein said cutting tool includes at least one radially extending cutting blade.

4. The apparatus according to claim 3 wherein said at least one cutting blade has one of a serrated and a non-serrated cutting surface.

5. The apparatus according to claim 1 wherein said cutting tool is a facing cutter.

6. The apparatus according to claim 1 wherein said cutting tool is a chamfering cutter.

7. The apparatus according to claim 1 wherein said cutting tool is a deburring cutter.

8. The apparatus according to claim 1 including a driver tool having a spring loaded spindle for engaging and rotating said cutting tool.

9. An apparatus for crowning the muzzle end of a firearm barrel comprising:
   an elongated rod-like pilot stem with upper and lower ends;
   an expandable collet slidably received on said pilot stem;
   a nut threadably attached to said lower end of said pilot stem;
   a deformable body attached to said nut whereby when said deformable body is inserted into a bore at a muzzle end of a firearm, said deformable body frictionally engages a wall of the bore to prevent rotation of said nut and permit rotation of said pilot stem relative to said nut in an engaging direction to expand said collet into contact with the wall of the bore; and
   a cutting tool rotatably received on said pilot stem at said upper end for engaging an end surface of the muzzle end.

10. The apparatus according to claim 9 wherein said deformable body is a cylinder formed of a deformable cylinder and having a diameter greater than a diameter of the bore.

11. The apparatus according to claim 9 wherein said cutting tool includes a plurality of radially extending cutting blades.

12. The apparatus according to claim 11 wherein said cutting blades each have one of a serrated and a non-serrated cutting surface.

13. The apparatus according to claim 9 wherein said cutting tool is a facing cutter.

14. The apparatus according to claim 9 wherein said cutting tool is a chamfering cutter.

15. The apparatus according to claim 9 wherein said cutting tool is a deburring cutter.

16. The apparatus according to claim 9 including a driver tool having a spring loaded spindle for engaging and rotating said cutting tool.

17. A method for crowning the muzzle end of a firearm barrel comprising the steps of:
   a) inserting an expandable collet on a pilot stem attached to a deformable body a predetermined distance into a bore at a muzzle end of a firearm barrel and frictionally engaging a wall of the bore with the deformable body;
   b) rotating the pilot stem to expand the collet into engagement with the wall of the bore;
   c) mounting a cutting tool on an upper end of the pilot stem and rotating the cutting tool relative to the pilot stem against an end surface of the muzzle end;
   d) removing the cutting tool from the pilot stem;
   e) rotating the pilot stem to retract the collet out of engagement with the wall of the bore; and
   f) removing the pilot stem, the collet and the deformable body from the bore.

18. The method according to claim 17 including performing said step a) by spacing the pilot stem upper end from the end surface of the muzzle end a distance measured on a body of a pilot wrench used to rotate the pilot stem.

19. The method according to claim 17 including repeating said steps c) and d) with at least one other cutting tool before performing said steps e) and f).

20. The method according to claim 17 including selecting the cutting tool from a facing cutter, a chamfering cutter and a deburring cutter.

* * * * *